United States Statutory Invention Registration [19]

[11] Reg. Number: H541

Childress

[43] Published: Nov. 1, 1988

[54] HOUSING FOR JAM RESISTANT ACTUATOR

[75] Inventor: James J. Childress, Federal Way, Wash.

[73] Assignee: The United States of America as represented by the Secretary of the Navy, Washington, D.C.

[21] Appl. No.: 89,117

[22] Filed: Aug. 25, 1987

[51] Int. Cl.[4] ..... F01B 11/02

[52] U.S. Cl. ..... 92/151; 92/170

*Primary Examiner*—Charles T. Jordan
*Assistant Examiner*—Michael J Carone
*Attorney, Agent, or Firm*—William C. Townsend; W. Thom Skeer; Stephen J. Church

[57] ABSTRACT

A ballistic damage tolerant, lightweight hydraulic actuator has a cylindrical liner with opposite open ends each surrounded by conical, outwardly extending projections of the liner. Each end receives a head which is detachably connected to the liner centrally of the projections by an element circumscribing the head. Resin impregnated filaments are wrapped about and extend between the projections at the opposite liner ends so that the filament reinforce the liner against axial forces but do not impede removal of the heads.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HOUSING FOR JAM RESISTANT ACTUATOR

CROSS REFERENCE TO RELATED APPLICATION

This application is a substitute for applicant's application Ser. No. 674,902, filed 26 Nov. 1984 and now abandoned.

BACKGROUND OF THE INVENTION

1. Field of the Invention

This invention pertains to expansible chamber devices. More particularly, this invention pertains to the cylinder details of such devices with coaxial cylinders. The subject invention also pertains to the filed of ordnance; more particularly to the shape and composition of a projectile defeating element.

2. Description of the Prior Art

It is known to provide redundancy in a hydraulic actuator system by providing two or more hydraulic cylinder assemblies connected to a common element to be positioned thereby. Each assembly is connected to an independent source of hydraulic pressure so that, in the event of leakage caused by damage to one assembly, another assembly can continue to actuate the element. It is also known to avoid jamming of such an actuator due to the projection of "petals" from a penetrated cylinder wall of one assembly into the path of a piston thereof by constructing the wall of material which is relatively thin and weak so that petals therefrom are shearable by engagement of the piston under the urging of the normal hydraulic pressure in one or more undamaged cylinder assemblies.

Certain prior art devices, although effective in resisting ballistically caused jams, were relatively heavy and expensive. Other known devices employ a hydraulic cylinder assembly having a tubular cylinder wall, which is incapable of withstanding without reinforcement the normal hydraulic operating pressure, together with a layer externally of the wall of resin impregnated filament, preferably graphite filament, which reinforces the wall. To reduce weight in such a construction it is desirable that the filament be arranged to reinforce the tubular wall against axial as well as circumferential stress. Reinforcement against axial stress can be effectively provided by wrapping the filament transversely of the tube about elements closing the tube ends. However, it is evident that repair of elements internal to the tube, such as pistons and seals, is not practical once the impregnated filament layer is applied.

SUMMARY OF THE INVENTION

A jam resistant actuator housing having a thin cylindrical wall reinforced by resin impregnated filaments wrapped about projections extending radially from each end of the wall to transfer longitudinal stresses from the wall ends to the filaments so that the filaments do not impede access in an axial direction to the interior of the wall.

An object of the invention is to provide such a housing in which resistance to axial and to circumferential stress is obtained by a layer of resin impregnated filament and which is adapted for repeated and convenient access to elements internal to the housing without disturbing the layer.

A further object is to provide such a housing, which is for use in a redundant actuator hydraulic system, having a pair of pistons arranged in tandem within the housing, the housing providing access therein from either or both of a pair of ends thereof, for repair of elements normally disposed interiorly of the housing.

BRIEF DESCRIPTION OF THE DRAWINGS

Other objects, advantages, and novel features of the invention will become apparent from the following detailed description of the invention when considered in conjunction with the accompanying drawings wherein.

DESCRIPTION OF THE PREFERRED EMBODIMENT

Figure 1:
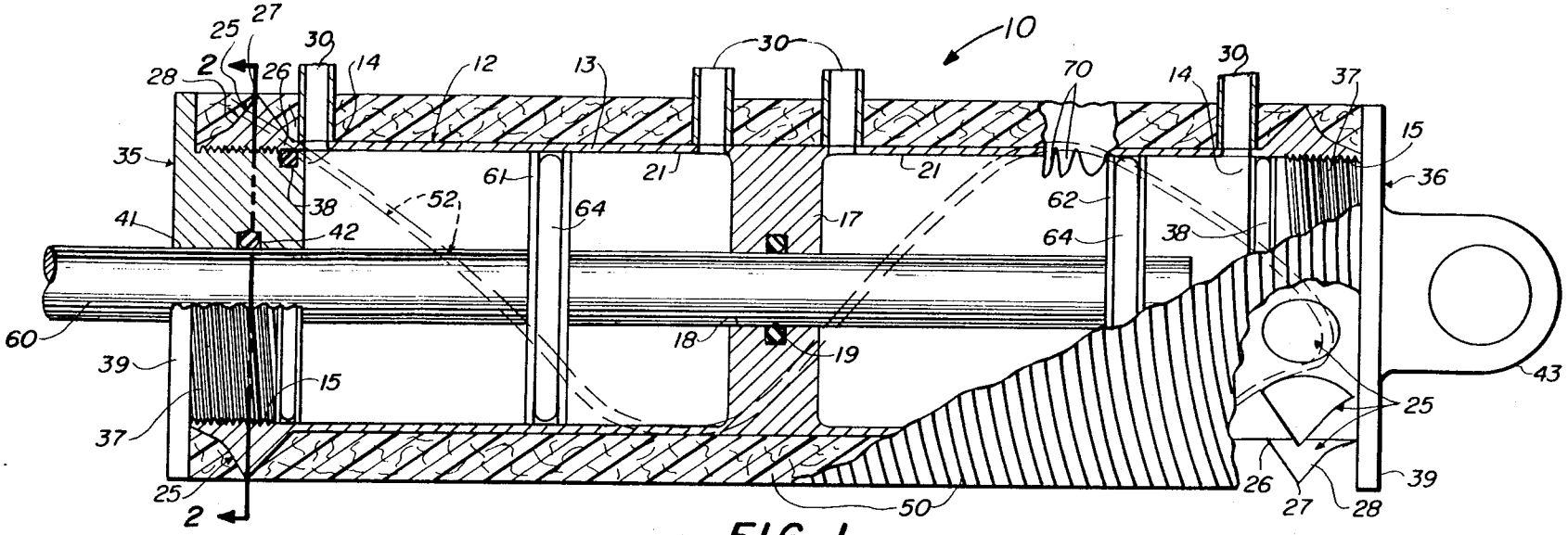
FIG. 1 is a side view of a jam resistant actuator with portions broken away to show the interior.
Figure 2:
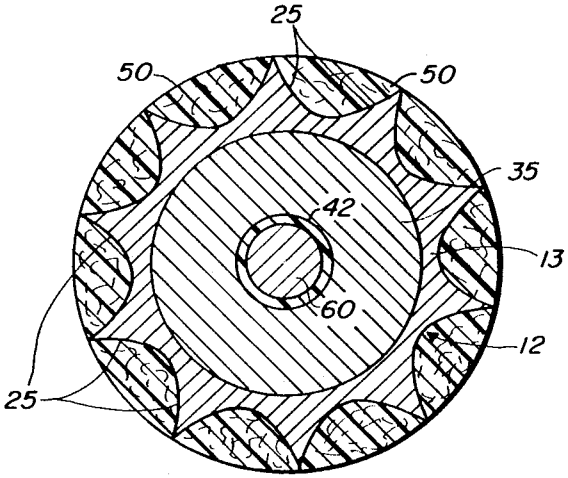
FIG. 2 is a section of the actuator of FIG. 1 taken on line 2—2 thereof.

Referring to FIG. 1, a housing 10 has a cylindrically tubular liner 12 having a wall 13, which is thin in relation to the usual hydraulic actuator wall, and axially opposite open ends 14. Liner 12 is provided with screw threads 15 extending inwardly from ends 14 and circumferentially about the interior thereof. Housing 10 has a discoidal bulkhead 17 extending transversely across liner 12 at its axial center and, preferably, unitarily constructed with liner 12 and thus fixedly mounted on it. Bulkhead 17 has an opening extended through it coaxially with liner 12, opening 18 having an annular internal groove which receives an O-ring 19. The liner has a pair of axially spaced portions defined individually by a pair of smoothly finished cylindrical surfaces 21 extending individually from each screw thread 15 to bulkhead 17.

Housing 10 has a plurality of substantially identical and generally cone shaped projections 25 equally spaced circumferentially about liner 12 adjacent to and immediately inward of each end 14. The projections, preferably, are unitarily constructed with liner 12 and bulkhead 17. Each projection 25 has a base portion 26 joined exteriorly to the liner. Axially each projection extends substantially radially outwardly from the liner, terminating at a tip portion 27 of the projection. The projections at each end 14 of liner 12 are aligned axially of liner 12 with the corresponding screw threads 15 and are disposed in circumscribing relation thereabout. Each projection has a side or load transfer surface 28 facing axially of liner 12 toward the adjacent one of ends 14 and oppositely of the other of these ends. Surface 28 is configured so that the corresponding side of the projection, in relation to the other sides thereof, is steeper toward tip portion 27; that is, the angle between a line along this surface and the axis of the projection is substantially less toward tip portion 27 than toward base portion 26.

Housing 10 has four fluid passages 30 of any suitable construction for introducing pressurized fluid into liner 12 individually at four locations axially therealong. Two of the passages 30 are disposed oppositely of and immediately outwardly of bulkhead 17 and the other two passages 30 are immediately inwardly of each of the screw threads 15. Typically, the passages are tubes extended radially from liner 12 at each such location, fixedly connected thereto as by welding, and communicating with the liner interior through bores in wall 13.

Housing 10 has a pair of end members or heads 35 and 36 fitted to liner 12 and received therein individually at ends 14. Each head has exterior screw threads 37 disposed for engagement with screw threads 15 at the corresponding end 14, so that screw threads 15 and 37 detachably connect the heads to the liner. Each head has a portion extending axially inwardly of liner 12 from the corresponding screw threads 15 within the adjacent surface 21, this portion being provided with an external annular groove which receives an O-ring 38 so that the heads 35 and 36 are in fluid-tight closing relation with their corresponding liner ends 14. Heads 35 and 36 have individual annular flanges 39 engaged with the corresponding liner end 14 and extended radially outwardly from wall 13 approximately the length of projections 25. Head 35 has a central opening 41 extended through it coaxially with bulkhead opening 18 and, similarly, provided with an internal annular groove which receives an O-ring 42. Head 36 has a lug 43 extended from it axially oppositely of head 35, the lug being provided with a bore for pivotal mounting of the housing as is usual in the hydraulic actuator art.

Housing 10 has a layer 50 of resin impregnated filament wrapped about liner 12 and applied in circumferential engagement therewith, the layer extending between liner ends 14 and flanges 39. Layer 50, typically and as indicated by long dash lines 52 in FIG. 1, has a plurality of strands wrapped helically about liner 12, each strand being wrapped about a pair of the projections 25 which are individual to liner ends 14. Strands 52 engage projection 25 at the load transfer surfaces 28 thereof so that forces between the strands and the projections are exerted generally axially of liner 12 and do not urge the strands radially from the liner. Since the strands are wrapped helically about liner 12, they extend both circumferentially and axially thereabout and are tensioned by forces axially and radially thereof due to fluid pressure therein exerted by fluid introduced through passages 30. The strands thus reinforce liner 12 against such forces. Such a layer having a plurality of wrappings in which strands run only substantially axially or substantially circumferentially may, of course, be utilized instead of a layer constructed as just described so long as the axially extending strands are wrapped about surfaces 28 of projections 25.

The actuator shown in FIG. 1 has a piston rod 60 internally received in liner 12 and extended axially through openings 18 and 41 in substantially fluid-tight relation due respectively to O-rings 19 and 42. A portion of rod 60 is represented as broken away outwardly of head 35; this portion is provided with any suitable mechanical connection to an element, not shown, and motivated by the actuator as the rod moves with a predetermined stroke approximately equal to the distance between bulkhead 17 and either detachable head 35 or 36. The actuator has a pair of coaxially related pistons 61 and 62 fixed to rod 60 in any suitable manner for movement therewith and spaced axially of liner 12 a distance greater than the predetermined stroke. Pistons 61 and 62 are individually internally received in and slidably fitted to surfaces 21 and bear individual O-rings 64. Piston 61 is disposed between head 35 and bulkhead 17 while piston 62 is disposed between head 36 and bulkhead 17 so that bulkhead 17 is between the pistons 61 and 62 and each head 35 or 36 is axially outward of liner 12 from the corresponding piston.

It is evident that each head 35 or 36 is urged outwardly of liner 12 and away from the opposite one of ends 14 by forces due to the pressure of fluid within liner 12. It is also evident that these forces are transferred from each head 35 or 36 by screw threads 15 and 37 to liner 12 at locations thereon adjacent to the one of the liner ends 14 adjacent to the head, these forces being transferred, in turn, through and from liner 12 to projections 25 and from thence to the strands of layer 50 engages therewith.

Liner 12 is relatively thin and is constructed of material, aluminum alloy for example, such that the strength of the liner alone, that is in the absence of layer 50, would be exceeded axially and circumferentially if the liner were subjected internally to a predetermined nominal working pressure. Wall 13 is thereby constructed so that protrusions, such as the petals 70 represented in FIG. 1, formed from the wall by projectile penetration are detachable therefrom by engagement with piston 62 as it is motivated by piston 61 when the latter piston is subjected to fluid pressure substantially less than such nominal pressure.

Obviously many modifications and variations of the present invention are possible in light of the above teachings. It is, therefore, to be understood that, within the scope of the appended claims, the present invention may be practiced other than as specifically described.

What is claimed is:

1. In a housing for use with fluid at a predetermined pressure in a jam resistant actuator having a piston where the housing includes:

a cylindrically tubular liner having axially opposite and axially open ends and slidably receiving the piston, the liner being of such thickness and constructed of such material that the strength of the liner alone would be exceeded axially when the liner is subjected internally to fluid at such pressure and that petals formed from the liner by projectile penetration thereof are detachable therefrom by engagement with the piston when the piston is motivated by a fluid pressure substantially less than said predetermined pressure;

a pair of heads individually received in the ends of the liner;

attachment means individual to each head for detachably connecting the head to the corresponding end of the liner;

means individual to each head for sealing the head in fluid-tight relation to the liner;

passage means for introducing such fluid into the liner so that pressure therein urges each head from the liner in a direction away from the other head; and a layer of resin impregnated filament wrapped peripherally about the liner to reinforce the liner against fluid pressure therein, the improvement comprising:

each attachment means having a force transfer element which extends generally circumferentially about the interior of the liner at the corresponding such end thereof and which engages the corresponding head;

the linear having a plurality of projections unitarily constructed therewith and extended radially from the liner at each of said ends thereof, the projections at each of said ends being spaced circumferentially of the liner in circumscribing relation to the corresponding force transfer element, and each projection bearing a load transfer surface facing axially of the liner and oppositely of the other end thereof;

the layer having a plurality of strands which extend axially of the liner and engage the projections at said load transfer surfaces thereof, fluid pressure forces exerted axially of the liner on each head being transferred therefrom by the corresponding force transfer element to the liner at locations thereon adjacent to the corresponding end thereof, and such forces being transferred from the liner to the projections and from the projections to the strands engaged therewith, so that the strands are tensioned by such forces and axially reinforce the liner thereagainst.

2. The housing of claim 1 wherein each projection is of generally conical configuration having an axis extending substantially radially of the liner, the projection having a base portion and having a tip portion which is disposed radially outwardly of the liner from the base portion, and wherein the angle between a line along such surface of the projection and the axis thereof is substantially less toward the tip of the projection than toward the base thereof.

* * * * *